United States Patent
Xu et al.

(10) Patent No.: US 12,485,542 B2
(45) Date of Patent: Dec. 2, 2025

(54) ROBOT SYSTEM AND CONTROL METHOD THEREOF

(71) Applicant: BEIJING SURGERII ROBOTICS COMPANY LIMITED, Beijing (CN)

(72) Inventors: Kai Xu, Beijing (CN); Jiangran Zhao, Beijing (CN)

(73) Assignee: BEIJING SURGERII ROBOTICS COMPANY LIMITED, Beijing (CN)

( * ) Notice: Subject to any disclaimer, the term of this patent is extended or adjusted under 35 U.S.C. 154(b) by 264 days.

(21) Appl. No.: 18/010,733

(22) PCT Filed: Jun. 15, 2021

(86) PCT No.: PCT/CN2021/099936
§ 371 (c)(1),
(2) Date: Dec. 15, 2022

(87) PCT Pub. No.: WO2022/037209
PCT Pub. Date: Feb. 24, 2022

(65) Prior Publication Data
US 2023/0256607 A1    Aug. 17, 2023

(30) Foreign Application Priority Data
Aug. 19, 2020 (CN) .......................... 202010839728.9

(51) Int. Cl.
*B25J 9/16* (2006.01)
*A61B 34/30* (2016.01)
*B25J 15/00* (2006.01)

(52) U.S. Cl.
CPC ............. *B25J 9/1682* (2013.01); *A61B 34/30* (2016.02); *A61B 2034/301* (2016.02); *B25J 15/0019* (2013.01)

(58) Field of Classification Search
CPC ..... B25J 9/1682; B25J 15/0019; A61B 34/30; A61B 2034/301
See application file for complete search history.

(56) References Cited

U.S. PATENT DOCUMENTS

| 2005/0193451 A1 | 9/2005 | Quistgaard et al. |
| 2005/0273198 A1 | 12/2005 | Bischoff |

(Continued)

FOREIGN PATENT DOCUMENTS

| CN | 105188590 A | 12/2015 |
| CN | 107427327 A | 12/2017 |

(Continued)

OTHER PUBLICATIONS

Extended European Search Report in related European Application No. 21857306.1 dated Jul. 25, 2024.

(Continued)

*Primary Examiner* — Ian Jen
*Assistant Examiner* — Renee LaRose
(74) *Attorney, Agent, or Firm* — Bayes PLLC

(57) ABSTRACT

A control method for controlling a robot system is provided. The robot system includes a plurality of motion arms. The plurality of motion arms include a reference motion arm and at least one following motion arm. The control method includes: controlling, based on an input command, the reference motion arm to move to a reference position and a reference orientation; determining a positioning position and a positioning orientation of the at least one following motion arm based on the reference position and the reference orientation of the reference motion arm and a relative pose relationship between the plurality of motion arms; and controlling the at least one following motion arm to move to the positioning position and the positioning orientation.

16 Claims, 6 Drawing Sheets

(56) References Cited

U.S. PATENT DOCUMENTS

| | | | |
|---|---|---|---|
| 2007/0293734 A1 | 12/2007 | Coste-Maniere et al. | |
| 2014/0350571 A1 | 11/2014 | Maillet et al. | |
| 2016/0008078 A1* | 1/2016 | Azizian | A61B 34/20 700/255 |
| 2017/0340396 A1* | 11/2017 | Romo | A61B 34/30 |
| 2018/0345492 A1 | 12/2018 | Watanabe et al. | |
| 2019/0307519 A1 | 10/2019 | Popovic | |
| 2020/0383734 A1* | 12/2020 | Dahdouh | A61B 34/30 |

FOREIGN PATENT DOCUMENTS

| | | |
|---|---|---|
| CN | 109330699 A | 2/2019 |
| CN | 110051436 A | 7/2019 |
| CN | 110142736 A | 8/2019 |
| CN | 111360830 A | 7/2020 |
| CN | 111390872 A | 7/2020 |
| CN | 111531538 A | 8/2020 |
| WO | 2016054256 A1 | 4/2016 |
| WO | 2020024946 A1 | 2/2020 |

OTHER PUBLICATIONS

International Search Report and Written Opinion in related PCT Application No. PCT/CN2021/099936 dated Sep. 15, 2021 (14 pages).

* cited by examiner

100

- 101 Control, based on an input command, a reference motion arm to move to a reference position and a reference orientation
- 103 Determine positioning position and orientation of at least one following motion arm based on reference position and orientation of reference motion arm and a relative pose relationship between a plurality of motion arms
- 105 Determine a motion sequence of the plurality of following motion arms
- 107 Control the at least one following motion arm to move to the positioning position and the positioning orientation

FIG. 1

ROBOT SYSTEM AND CONTROL METHOD THEREOF

CROSS-REFERENCE TO RELATED APPLICATIONS

This application is a national stage of International Application No. PCT/CN2021/099936, filed on Jun. 15, 2021, which claims priority to Chinese Patent Application No. 202010839728.9, filed on Aug. 19, 2020. The entire contents of each of the above-identified applications are expressly incorporated herein by reference.

TECHNICAL FIELD

The present disclosure relates to the field of medical devices, and in particular, to a robot system and a control method thereof.

BACKGROUND

Compared with traditional open surgeries, minimally invasive endoscopic surgeries have been widely used due to little surgical trauma, faster postoperative recovery, and fewer postoperative infections and complications. In existing endoscopic surgical robot systems, surgical instruments are carried by motion arms. According to different patients and surgical procedures, a position of a motion arm needs to be adjusted before or during a surgery, such that a surgical instrument is adjusted to a specified surgical position. During a surgery, a surgeon controls, in a remote operation mode, a surgical actuator at an end of a surgical instrument to perform surgical operations on different parts. For a surgical robot system, whether a surgical robot may perform various surgical procedures directly depends on the spatial positioning capability of an external motion arm.

At present, a surgical process performed by a surgical robot mainly includes three processes: preoperative positioning, surgical preparation, and postoperative arrangement. In the preoperative positioning and preparation processes, a surgical assistant (such as a nurse or a surgeon) first adjusts at least one motion arm to a proper position and orientation based on a surgical type and a surgical position, so that at least one motion arm is connected to a cannula assembly and a surgical instrument on the motion arm enters a human body through the cannula assembly to reach a corresponding position where a surgery is required. During the surgery, the surgical instrument is controlled through a remote operation to follow an input-end command to reach various positions and angles within a range, so as to perform various operation actions.

For an existing surgical robot, in preoperative positioning and preparation processes, especially in a surgical preparation process of an endoscopic surgery performed by using the surgical robot, a process of adjusting a motion arm according to a surgical angle is complicated, a sequence of adjustment of the motion arm is specified, and each motion arm needs to be manually moved to a corresponding position, which is inefficient and inaccurate. In the surgical preparation process, a sterile protective sleeve needs to be sleeved on the surgical robot, for example, a motion arm, to isolate the surgical instrument on a sterile side from the motion arm on a bacterial side, so as to ensure surgical hygiene and safety. However, in a process of connecting a motion arm to a cannula assembly, a delicate part of the sterile protective sleeve is often pulled off due to various reasons. If there is no prompt at this time, surgical contamination is easily caused during a surgery.

SUMMARY

In some embodiments, the present disclosure provides a control method for a surgical robot system. The surgical robot system includes a plurality of motion arms, the plurality of motion arms include a reference motion arm and at least one following motion arm, and the control method includes: controlling, based on an input command, the reference motion arm to move to a reference position and a reference orientation; determining a positioning position and a positioning orientation of the at least one following motion arm based on the reference position and the reference orientation of the reference motion arm and a relative pose relationship between the plurality of motion arms; and controlling the at least one following motion arm to move to the positioning position and the positioning orientation.

In some embodiments, the present disclosure provides a robot system, including: a plurality of motion arms, where the plurality of motion arms include a reference motion arm and at least one following motion arm; and a control apparatus, configured to: control, based on received input information, the reference motion arm to move to a reference position and a reference orientation, determine a positioning position and a positioning orientation of the at least one following motion arm based on the determined reference position and reference orientation and a relative pose relationship between the plurality of motion arms, and control the at least one following motion arm to move to the positioning position and the positioning orientation.

BRIEF DESCRIPTION OF DRAWINGS

To describe technical solutions in embodiments of the present disclosure more clearly, the following briefly describes the accompanying drawings required for describing the embodiments of the present disclosure. The accompanying drawings in the following descriptions show merely some embodiments of the present disclosure, and those of ordinary skill in the art may still derive other embodiments from the content of the embodiments of the present disclosure and these accompanying drawings without creative efforts.

FIG. 1 is a flowchart of a control method for a robot system according to some embodiments of the present disclosure;

DETAILED DESCRIPTION

Figure 2:
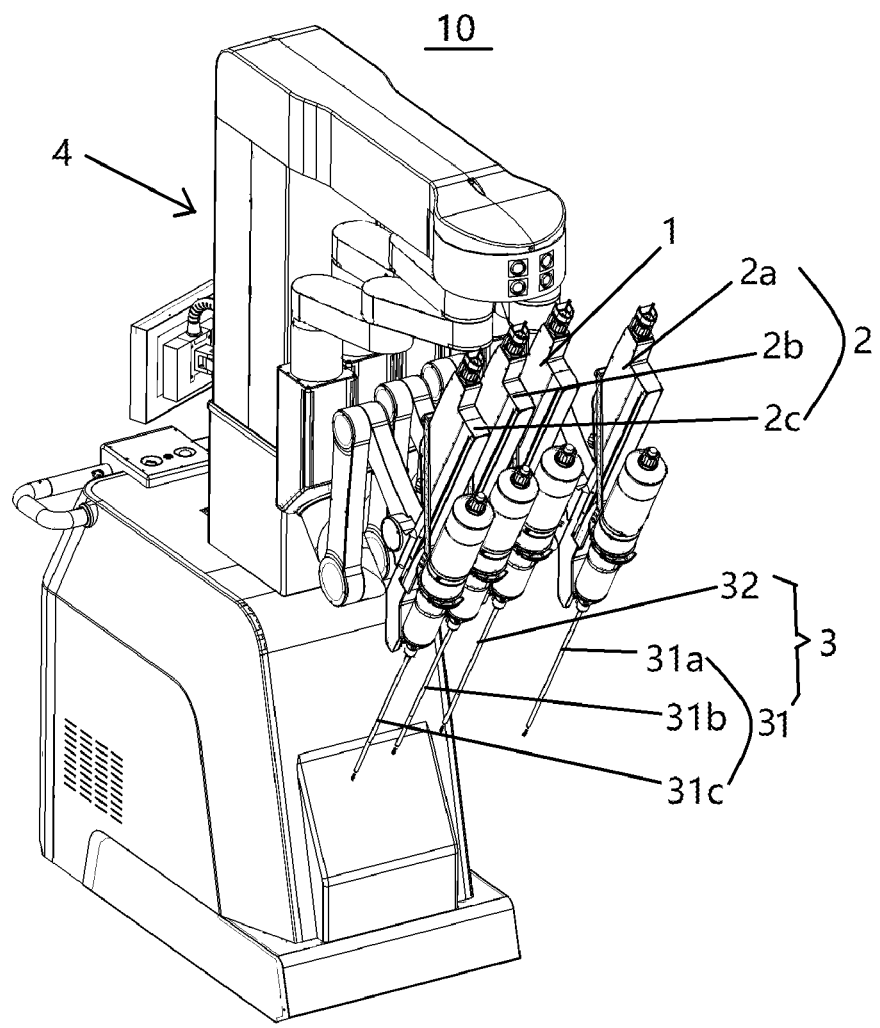
FIG. 2 is a schematic structural diagram of a robot system according to some embodiments of the present disclosure.

To make the resolved technical problems, used technical solutions, and achieved technical effects of the present disclosure more clearly, the technical solutions in embodiments of the present disclosure are further described in detail below with reference to the accompanying drawings. Apparently, the described embodiments are merely exemplary rather than all of the embodiments of the present disclosure.

In descriptions of the present disclosure, it should be noted that, direction or position relationships indicated by terms such as "central", "upper", "lower", "left", "right", "vertical", "horizontal", "inner", and "outer" and the like are direction or position relationships based on the accompanying drawings, and are merely intended to facilitate the descriptions of the present disclosure and simplify the descriptions, rather than indicating or implying that a referred apparatus or element must have a particular direction or be constructed and operated in a particular direction. Therefore, these terms should not be interpreted as limiting the present disclosure. In addition, the terms "first" and "second" are for descriptive purposes only, and should not be construed as indicating or implying relative importance. It should be noted that, in the descriptions of the present disclosure, unless expressly specified and limited otherwise, the terms "mounted", "connected to each other", "connected to", and "coupled" should be understood in a broad sense. For example, "connection" may be a fixed connection, a detachable connection, a mechanical connection, or an electrical connection; or may be a direct connection or an indirect connection through an intermediate medium; or may be an internal communication between two elements. For those of ordinary skill in the art, specific meanings of the foregoing terms in the present disclosure may be understood based on specific situations. In the present disclosure, an end closer to an operator (for example, a surgeon) is defined as a nearer end or a nearer part or a rear end or a rear part, and an end closer to a surgical patient is defined as a farther end or a farther part or a front end or a front part. Those skilled in the art may understand that the embodiments of the present disclosure may be applied to medical devices or surgical robots, and may also be applied to other non-medical apparatuses.

In the present disclosure, the term "position" refers to a location of an object or a part of the object in three-dimensional space (for example, changes in Cartesian X, Y, and Z coordinates may be used to describe three translational degrees of freedom, for example, three translational degrees of freedom along the Cartesian X-axis, Y-axis, and Z-axis). In the present disclosure, the term "orientation" refers to a setting of rotation of an object or a part of the object (for example, three rotational degrees of freedom may be described by roll, pitch, and yaw). In the present disclosure, the term "pose" refers to a combination of a position and an orientation of an object or a part of the object, and may be described by, for example, six parameters of the six degrees of freedom mentioned above. In the present disclosure, a pose of a motion arm or a part of the motion arm refers to a pose indicated by a coordinate system defined by the motion arm or the part of the motion arm relative to a coordinate system defined by a support or a base of the motion arm or the world coordinate system. In the present disclosure, a position of a motion arm or a part of the motion arm may be represented by a set of joint values (for example, a one-dimensional matrix formed by these joint values) of joints of the motion arm. In the present disclosure, a joint value of a joint may include an angle by which the corresponding joint rotates about the corresponding joint axis or a distance by which the corresponding joint moves relative to an initial position of the joint.

FIG. 1 is a flowchart 100 of a control method for a robot system according to some embodiments of the present disclosure. FIG. 2 is a schematic structural diagram of a robot system 10 according to some embodiments of the present disclosure. The method 100 may be performed by a control apparatus (for example, a control apparatus 5 shown in FIG. 4) for the robot system 10, and may be implemented by software and/or hardware. For example, the control apparatus for the robot system 10 may include a processor (for example, a processor 51 shown in FIG. 4) and is configured to perform the method 100. In some embodiments, as shown in FIG. 2, the robot system 10 may include a plurality of motion arms, such as a motion arm 1 and a motion arm 2 (for example, motion arms 2a, 2b, and 2c). The motion arm 1 may be used as a reference motion arm, and the motion arm 2 may be used as a following motion arm. It should be understood that the reference motion arm may be a motion arm used to assist in determining a position and an orientation of at least one following motion arm, or may be a motion arm used for reference during motion of at least one following motion arm. A following motion arm may include a motion arm whose position and orientation are determined based on a position and an orientation of a reference motion arm, or may be a motion arm that moves based on a reference motion arm. A following motion arm may or may not have a same structure as a reference motion arm. In some embodiments, a surgical instrument 3 (for example, a surgical tool or an endoscope) may be detachably disposed on each motion arm, and each surgical instrument 3 is configured to enter an operation area through a cannula assembly. The cannula assembly may be fixed at a surgical opening (for example, an incision or a natural opening) of a patient and is connected to a motion arm. The operation area may be an area in which a surgery is performed. For example, the motion arm 1 may be detachably connected to an endoscope 32, and the motion arm 2 may be detachably connected to a surgical tool 3 (for example, surgical tools 31a, 31b, and 31c). In some embodiments, the robot system 10 may include a patient-side cart 4 on which the plurality of motion arms 1 and 2 may be disposed. The surgical instrument 3 may include the surgical tool 31 and the endoscope 32. The surgical tool 31 or the endoscope 32 may include a drive transmission apparatus, an arm body, and an end apparatus. The end apparatus of the surgical tool 31 may include, but is not limited to, a surgical forceps, an electric scalpel, an electric hook, and the like. The end apparatus of the endoscope 32 may include, but is not limited to, an imaging apparatus or an illumination apparatus.

It should be understood that some embodiments may be applicable to cases where each motion arm is controlled, based on a surgical type before a surgery, to move. For example, one or more motion arms in FIG. 2 are in a storage position before the one or more motion arms are moved. The storage position may be a preset initial position of a motion arm before a surgery. For example, in the storage position, each motion arm may be in a folded state to reduce occupied space. In some embodiments, the storage position may be set to a zero position of an orientation of a motion arm.

Since a surgery needs to be performed in a sterile environment, a sterile protective sleeve needs to be sleeved on each motion arm and another component (for example, a main column of the patient-side cart 4) of the robot system 10 before the surgery. Therefore, each motion arm may be moved to a mounting position of the protective sleeve. When reaching the mounting position of the protective sleeve from the storage position, a motion arm stretches to the farther end and a distance between motion arms is increased, so that the farther end of the motion arm is in an orientation basically parallel to the ground or slightly inclined downwards or upwards to facilitate wearing the protective sleeve. In this position, the sterile protective sleeve is mounted according to a wearing requirement and procedure of the protective sleeve, so that each motion arm is isolated from a sterile environment and the surgical instrument disposed on the motion arm is in a sterile environment. It should be understood that in the storage position and the mounting position of the protective sleeve, surgical instruments may not be disposed on the plurality of motion arms. In the mounting position of the protective sleeve, each motion arm is in a largely stretched state, so that a user may put the sterile protective sleeve on each motion arm to achieve effective isolation between a sterile environment and a bacterial environment.

After the protective sleeve is mounted, each motion arm may be folded from the stretched state to reach a folding position between the storage position and the mounting position of the protective sleeve (for example, the folding position may be close to the storage position for ease of motion). In the folding position, a user may move the robot system 10 (for example, the patient-side cart 4) in a folded state to a position near an operating table (in this case, a patient may already lie on the operating table).

After the patient-side cart 4 is moved near the operating table, each motion arm may be in an adjustment position. In the adjustment position, each motion arm may be adjusted or controlled, such that a position and an orientation of each motion arm may be adjusted to a position and orientation proper for a surgery. The adjustment position may include a folding position and a plurality of transition positions that exist during adjustment of the motion arm. For example, the position and orientation proper for the surgery may refer to a position and orientation in which each motion arm may be connected to a cannula assembly. In the adjustment position, a control method for a robot system in the embodiments of the present disclosure, for example, the method 100, may be performed.

Referring to FIG. 1, in step 101, a reference motion arm is controlled, based on an input command, to move to a reference position and a reference orientation. In some embodiments, the input command may include a command input by a user by using an input apparatus or an instruction stored on a non-volatile storage medium. It should be understood that the input command may include a motion command for the reference motion arm, and the reference motion arm may be commanded, based on the motion command, to move.

In some embodiments, the control apparatus of the robot system 10 may include an input apparatus. In some embodiments, the input apparatus may include a user interface, such as a keyboard, a touch screen, or a button. For example, a user may press a button corresponding to a motion arm to generate a motion command that controls the corresponding motion arm to move. Based on the motion command, the corresponding motion arm may be moved. When the motion arm moves to a target position and a target orientation (for example, the reference position and the reference orientation), the user may re-press or release the button corresponding to the motion arm to generate a stop command, and motion of the motion arm is stopped based on the stop command. The user interface may include functions such as "confirm key", "start/stop key", "previous step", or "next step". These functions may be used for integrated or separate control of motion arms, or integrated or separate control of step and procedure states.

In some embodiments, the input apparatus may further include a touch screen, and a user may trigger, via the touch screen, an operation of moving each motion arm, so as to generate a motion command for moving each motion arm. It should be understood that an operation of stopping motion of each motion arm may also be triggered via the touch screen, so as to generate a stop instruction for stopping motion of each motion arm.

In some embodiments, the input apparatus may further include a fine-adjustment input module. The fine-adjustment input module may be disposed on the motion arm and/or on the surgical instrument connected to the motion arm, and is configured to adjust motion of a single motion arm to control joint orientation adjustment of the single motion arm, so as to adjust an orientation of the surgical instrument on the motion arm. The fine-adjustment input apparatus may include a button for fine adjustment of the motion arm.

In some embodiments, the patient-side cart 4 is moved near the operating table, and a user may adjust a height correspondence and a horizontal distance correspondence between the patient-side cart 4 (for example, a motion arm disposed on the patient-side cart 4) and the operating table according to an indicator disposed on the patient-side cart 4. In some embodiments, the indicator may include, for example, a laser alignment light emitting light downwards from the top of the patient-side cart 4 (for example, a main column). The indicator may indicate a position and an operating height of the operating table 4 or a surgical opening of a patient on the operating table, and a distance between the patient-side cart 4 and the operating table or a surgical opening of a patient on the operating table. A user may generate an input command (for example, a plurality of movement commands) through a user interface (for example, a button) based on the position and the operating height of the operating table or the surgical opening of the patient on the operating table, and the distance between the patient-side cart 4 and the operating table or the surgical opening of the patient on the operating table, to adjust a height of the patient-side cart 4 and translate the patient-side cart 4, so that the indicator is in a position corresponding to that of a surgical opening of a surgical part. In some embodiments, the corresponding position may be a position where the indicator may cover the surgical opening, or a position where the indicator forms an angle with the surgical opening, or may indicate another position relationship.

In some embodiments, when the indicator on the patient-side cart 4 is in the position corresponding to that of the surgical opening of the surgical part, the reference motion arm 1 disposed on the patient-side cart 4 may be moved to a position of the cannula assembly close to the surgical opening, and the reference motion arm 1 may be in the reference position and the reference orientation. In some embodiments, when the indicator on the patient-side cart 4 is in the position corresponding to that of the surgical opening of the surgical part, the reference motion arm 1 may also be close to the reference position and the reference orientation. In this way, the user may further input a motion command for the reference motion arm through a user interface (for example, a button), to further adjust a pose of the reference motion arm 1 to move the reference motion arm 1 to the reference position and the reference orientation.

In some embodiments, the reference motion arm 1 of the robot system 10 is moved, based on a motion command, to a reference pose, where the reference pose includes the reference position and the reference orientation. In some embodiments, the reference motion arm 1 may be a motion arm used to assist in determining a position and an orientation of at least one following motion arm 2, or may be a motion arm used for reference during motion of at least one following motion arm 2. For example, the reference motion arm 1 may be detachably connected to the endoscope 32. The following motion arm 2 may be detachably connected to a surgical tool. In some embodiments, the reference motion arm 1 is provided with the endoscope 32, and in the reference pose, the endoscope 32 (for example, an arm body and an end instrument disposed at an end or a farther end of the arm body) may smoothly enter a surgical operation area through a cannula assembly. In some embodiments, the reference pose may be a position and an orientation of an end (for example, an end arm or a farther end of the end arm) of the reference motion arm 1. Alternatively, the reference pose may be a position and an orientation of a remote center of motion (RCM) of the reference motion arm 1. Alternatively, the reference pose may be a position and an orientation of a connection point, where the reference motion arm 1 is connected to the cannula assembly, on the reference motion arm 1 (for example, the connection point may be located at an end of the end arm). It should be understood that the position of the connection point may include a position within a preset distance from the cannula assembly. The preset distance may include, but is not limited to, 10 cm or the like. The reference orientation may be an orientation of the reference motion arm 1 in the reference position. In some embodiments, when a surgical instrument (for example, the endoscope 32) is disposed on the reference motion arm 1, the reference pose may alternatively be a position and an orientation of the surgical instrument.

In step 103, a positioning position and a positioning orientation of at least one following motion arm are determined based on the reference position and the reference orientation of the reference motion arm and a relative pose relationship between a plurality of motion arms. In some embodiments, the relative pose relationship between the plurality of motion arms is determined based on a surgical type or a cannula assembly configuration. It should be understood that the relative pose relationship may include a relative pose relationship between at least one following motion arm and the reference motion arm. In some embodiments, the positioning position and the positioning orientation may be a position and an orientation of an end (for example, an end arm or a farther end of the end arm) of the following motion arm 2. Alternatively, the positioning position and the positioning orientation may be a position and an orientation of a remote center of motion (RCM) of the following motion arm 2. Alternatively, the positioning position and the positioning orientation may be a position and an orientation of a connection point, where the following motion arm 2 is connected to the cannula assembly, on the following motion arm 2. It should be understood that the position of the connection point may include a position within a preset distance from the cannula assembly. The preset distance herein may include, but is not limited to, 10 cm or the like. The positioning orientation may be an orientation of the following motion arm 2 in the positioning position. Due to different cannula assembly configurations, each following motion arm 2 has a corresponding positioning position and positioning orientation. Positioning orientations (for example, orientations) of following motion arms 2 may alternatively be different in positioning positions. In some embodiments, when a surgical instrument (for example, the surgical tool 31) is disposed on the following motion arm 2, the positioning position and the positioning orientation may alternatively be a position and an orientation of the surgical instrument.

In some embodiments, a cannula assembly configuration may be determined based on a current surgical type, to determine the relative pose relationship between the plurality of motion arms. It should be understood that the current surgical type may be a type of a surgery that is currently required. For example, the surgical type may include, but is not limited to, general surgery, thoracic surgery, urological surgery, gynecological surgery, and the like. In some embodiments, the cannula assembly configuration may include a cannula assembly type, for example, cannula assembly specifications and models in different surgical procedures (the specifications and models may include, but are not limited to, for example, cannula assembly lengths, radial dimensions, and inner diameters, the number of cannulas, and a relative position relationship between a plurality of disposed cannulas). Relative pose relationships between a plurality of cannula assemblies and at least one motion arm are associated, and relative pose relationships between cannula assemblies with different configurations and each motion arm may be different.

In step 107, the at least one following motion arm is controlled to move to the positioning position and the positioning orientation. It should be understood that the reference motion arm 1 is in the reference position and the reference orientation, and the at least one following motion arm 2 is in the positioning position and the positioning orientation, such that the reference motion arm 1 and the at least one following motion arm 2 are connected to the cannula assembly. The cannula assembly is at the surgical opening of the patient on the operating table, and corresponding cannula assemblies may be selected for different types of surgeries. For a single-incision surgery, the cannula assembly may have a plurality of cannulas arranged at an angle, and the reference motion arm 1 and the at least one following motion arm 2 may be respectively connected to the plurality of cannulas of the cannula assembly. In some embodiments, at least a part of the cannula assembly is configured to extend into the body of a patient, and a part of the cannula assembly exposed outside the body of the patient may be configured to be connected to the reference motion arm 1 and the at least one following motion arm 2. A surgical instrument 3 is disposed on the reference motion arm 1 and the at least one following motion arm 2, and the surgical instrument 3 (for example, a part of an arm body of the surgical instrument 3 and an end instrument disposed at an end of the arm body) is configured to enter an operation area through the cannula assembly. For example, the surgical instrument on the reference motion arm 1 may include the endoscope 32, and the surgical instrument on the following motion arm 2 may include the surgical tool 31. In some embodiments, the reference motion arm 1 is detachably connected to the endoscope 32. When the reference motion arm 1 is in the reference position and the reference orientation, the endoscope 32 may enter a surgical operation area through the cannula of the cannula assembly. At least one following motion arm 2 is detachably connected to the surgical tool 31. When each following motion arm 2 is in a corresponding positioning position and positioning orientation, the surgical tool 31 on the following motion arm 2 may smoothly enter the surgical operation area through the cannula of the cannula assembly.

In this way, the positioning position and the positioning orientation of the following motion arm 2 may be determined based on a current surgical type and a cannula assembly configuration and the reference position and the reference orientation of the reference motion arm 1, which reduces preoperative preparations and improves operative efficiency.

In some embodiments, a target position and a target orientation of the surgical instrument, in the cannula assembly, disposed on the motion arm are determined based on the reference position and the reference orientation of the reference motion arm, the positioning position and the positioning orientation of the following motion arm, and a position and an orientation of the cannula assembly. It should be understood that when the cannula assembly is disposed at a surgical opening, the reference motion arm 1 is moved to the reference position and the reference orientation, so that the reference motion arm 1 may be connected (for example, through a connection point for connection to the cannula assembly) to the cannula assembly (for example, one of the cannulas). At least one following motion arm 2 is moved to the positioning position and the positioning orientation, so that the at least one following motion arm 2 is connected (for example, through a connection point for connection to the cannula assembly) to the cannula assembly (for example, some other cannulas). Therefore, a position and an orientation, in the cannula assembly, of the endoscope 32 on the reference motion arm 1 or the surgical tool 31 on the following motion arm 2 may be determined. It should be understood that a part of an end of the endoscope 32 may already extend into the cannula assembly when the endoscope 32 is mounted on the reference motion arm 1, but does not reach a surgical operation area. In some embodiments, the end of the endoscope 32 on the reference motion arm 1 may be controlled, based on a motion command, to enter the surgical operation area through the cannula assembly, to determine an internal environment of the surgical operation area. The end of the endoscope 32 is adjusted to determine the optimal surgical position or field of view, to determine a target position and a target orientation of the end of the endoscope 32. A target position and a target orientation of the surgical tool 31, in the cannula assembly, disposed on the following motion arm 2 may be determined based on the target position and the target orientation of the endoscope 32 (for example, the end of the endoscope 32) in the surgical operation area, to control the target position and the target orientation of the surgical tool 31 after entering the surgical operation area through the cannula assembly. The surgical tool 31 configured on each following motion arm 2 may be accurately moved, thereby accelerating preoperative preparations and improving working efficiency.

In some embodiments, optionally, the at least one following motion arm includes a plurality of following motion arms. The method 100 may further include step 105. In step 105, a motion sequence of the plurality of following motion arms is determined. In some embodiments, the motion sequence of the plurality of following motion arms 2 may be determined based on a current surgical type. The plurality of following motion arms 2 are controlled, based on the motion sequence, to move to the positioning position and the positioning orientation.

In some embodiments, the at least one following motion arm 2 may include, but is not limited to, two, three, four, or more following motion arms. In some embodiments, as shown in FIG. 2, the at least one following motion arm 2 may include a following motion arm 2a, a following motion arm 2b, and a following motion arm 2c. In some embodiments, the motion sequence of the at least one following motion arm is determined based on a surgical instrument corresponding to the at least one following motion arm. For example, a preset sequence of surgical instruments (for example, surgical tools 31a to 31c) corresponding to the following motion arms 2a to 2c may be determined based on a current surgical type. Based on the preset sequence of the surgical tools 31a to 31c, the motion sequence of the following motion arms 2a to 2c is determined. For example, the following motion arms 2a, 2b, and 2c may be configured to carry the surgical tools 31a, 31b, and 31c respectively. For example, the current surgical type is abdominal tumor resection. In subsequent operation, the surgical tool 31a, the surgical tool 31b, and the surgical tool 31c need to be used, and a usage sequence thereof is the surgical tool 31b—the surgical tool 31a—the surgical tool 31c. It should be understood that the usage sequence of the surgical tools may be used as a motion sequence of the corresponding following motion arms in the current surgical type. The following motion arms 2a, 2b, and 2c configured with the surgical tool 31a, the surgical tool 31b, and the surgical tool 31c are respectively controlled, based on the usage sequence, to sequentially move the corresponding following motion arms 2b, 2a, and 2c to the positioning pose in the usage sequence of the surgical tool 31b—the surgical tool 31a—the surgical tool 31c.

In some embodiments, the motion sequence of the at least one following motion arm may alternatively be determined based on a position relationship between the at least one following motion arm and the reference motion arm. For example, the motion sequence of the at least one following motion arm 2 may be determined based on an initial position relationship of the at least one following motion arm 2 relative to the reference motion arm 1. For example, as shown in FIG. 2, the robot system 10 may include the reference motion arm 1, and the at least one following motion arm 2 may include a following motion arm 2a, a following motion arm 2b, and a following motion arm 2c. In some embodiments, after the reference motion arm 1 is moved to the reference pose, based on a position correspondence between the following motion arms 2a, 2b, and 2c shown in FIG. 2, the following motion arm 2a or 2b close to the reference motion arm 1 is first moved to the positioning pose, and then the following motion arm 2c far away from the reference motion arm 1 is moved to the positioning pose. For example, the following motion arm 2b may be first moved to the positioning pose, then the following motion arm 2c may be moved to the positioning pose, and finally the following motion arm 2a may be moved to the positioning pose. It should be understood that after the reference motion arm 1 is moved to the reference pose, if the following motion arm 2c is moved first and then the following motion arm 2b is moved, the risk of collision between motion arms may increase. Since the reference motion arm 1 is close to the following motion arm 2c in the positioning pose, in a process of moving the following motion arm 2b to the positioning pose, the following motion arm 2b is prone to collide with the following motion arm 1 and/or the following motion arm 2c. Therefore, the following motion arm 2b may be first moved to the positioning pose, then the following motion arm 2c may be moved to the positioning pose, and finally the following motion arm 2a may be moved to the positioning pose. It should be understood that, alternatively, the following motion arm 2b may be first moved to the positioning pose, then the following motion arm 2a may be moved to the positioning pose, and finally the following motion arm 2c may be moved to the positioning pose. This is because the following motion arm 2a and the following motion arm 2b are not close to each other. It should be understood that a principle for determining the motion sequence may be as follows: A following motion arm close to the reference motion arm 1 in the reference pose is first moved to the positioning pose, and then a following motion arm far away from the reference motion arm 1 is moved to the positioning pose.

In this way, the at least one following motion arm 2 is controlled, based on the motion sequence, to sequentially move to the corresponding position, to avoid a problem of low efficiency and motion inaccuracy caused by manually moving the following motion arm 2, and automatically and efficiently move the following motion arm 2.

In some embodiments, the method 100 may further include: detecting an abnormality that occurs during motion of the at least one following motion arm; and based on the abnormality, controlling the at least one following motion arm to stop moving or sending of alarm information. In some embodiments, the abnormality may include at least one of the following: there is an undesired relationship between at least two of the plurality of motion arms, at least one of the at least one following motion arm exceeds the motion range limit, or a sterile protective sleeve on at least one of the plurality of motion arms falls off. For example, the abnormality may include, but is not limited to: there is an undesired relationship (for example, a collision) between at least one following motion arm 2 and/or between at least one following motion arm 2 and the reference motion arm 1, at least one following motion arm 2 exceeds the motion range limit, or a sterile protective sleeve on at least one following motion arm 2 and/or the reference motion arm 1 falls off. In some embodiments, if an abnormality is detected when a following motion arm 2 moves to the positioning pose, for example, the following motion arm 2 collides with another motion arm or the sterile protective sleeve of the following motion arm 2 falls off, the following motion arm 2 that have a collision may be controlled to stop moving, to avoid damage to the following motion arm.

In some embodiments, if an abnormality is detected when a following motion arm 2 moves to the positioning pose, alarm information may be sent based on the abnormality. In some embodiments, the alarm information may be displayed on a display screen. The display screen may be disposed in any position on the patient-side cart 4, for example, may be located at a bracket of the patient-side cart 4 where the motion arms of the patient-side cart 4 are converged. It should be understood that the display screen may alternatively be disposed in another place different from the patient-side cart 4. The display screen may display alarming information indicating the abnormality. For example, when a protective cover on a motion arm falls off, the display screen may display alarming information "The protective cover falls off, please check the protective cover."

In some embodiments, the alarming information sent for the abnormality may alternatively be output through another output module (for example, a speaker or an alarm indicator) of the patient-side cart 4. For example, when a protective cover on a motion arm falls off, the display screen may display alarming information "The protective cover falls off, please check the protective cover." Alternatively, a speaker may emit an alarm sound, or an alarm indicator may flash. According to the alarming information, a user may check the alarming information in time and solve the problem in time, so that the user may be reminded to learn of various abnormalities in motion of the following motion arm in real time, and smooth motion of the following motion arm can be ensured.

It should be understood that the display screen may further be configured to display a process operation instruction during motion of each following motion arm 2. For example, when the patient-side cart 4 moves to a position close to the operating table, the display screen may display indication information for moving each reference motion arm 1 to the reference position. After each following motion arm 2 is in the positioning position in the positioning orientation, the display screen may further display indication information indicating that each following motion arm 2 has been moved to the positioning position, and the like.

Figure 3:
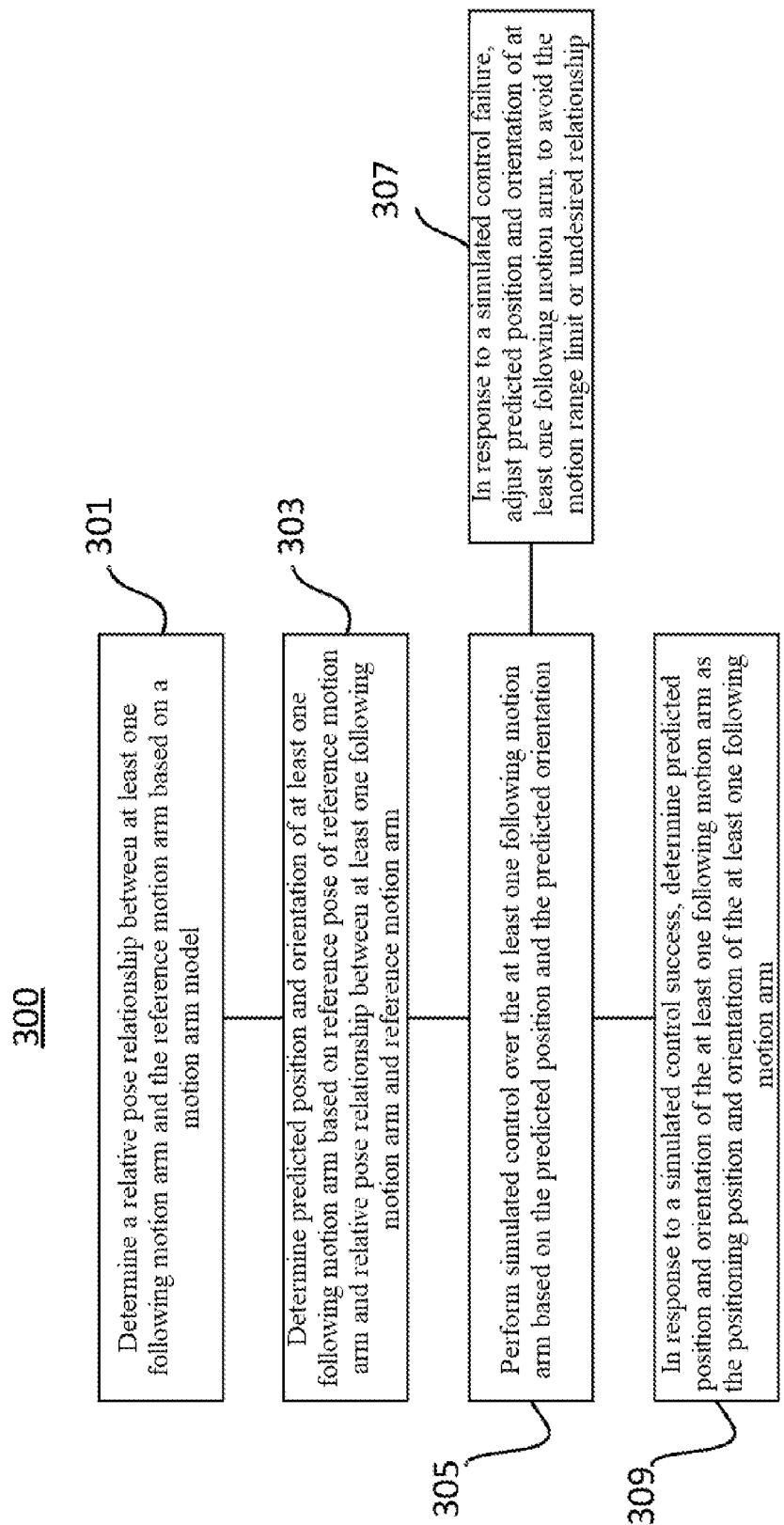
FIG. 3 is a flowchart of another control method for a robot system according to some embodiments of the present disclosure.

FIG. 3 is a flowchart of a method 300 for determining a position and an orientation of a motion arm according to some embodiments of the present disclosure. The method 300 may be performed by a control apparatus (for example, a control apparatus 5 shown in FIG. 4) for the robot system 10, and may be implemented by software and/or hardware. For example, the control apparatus for the robot system 10 may include a processor (for example, a processor 51 shown in FIG. 4) and is configured to perform the method 300. The method 300 may be used to perform, for example, step 103 shown in FIG. 1, to determine the positioning position and the positioning orientation of the at least one following motion arm.

Referring to FIG. 3, in step 301, a relative pose relationship between at least one following motion arm and the reference motion arm is determined based on a motion arm model. It should be understood that the motion arm model may be preset. In some embodiments, the motion arm model may be a model configured based on a current surgical type or a corresponding cannula assembly configuration, and may be used to define the relative pose relationship between the plurality of motion arms. In some embodiments, a current surgical type or a corresponding cannula assembly shape and structure may be selected through a touch screen input module on the patient-side cart 4, to determine the motion arm model. It should be understood that relative positions and relative orientations of the reference motion arm 1 and the at least one following motion arm 2 are associated with a surgical type or a corresponding cannula assembly configuration. The motion arm model may be used to determine a relative pose relationship between the at least one following motion arm 2 and the reference motion arm 1, and a relative pose relationship between the following motion arms 2 in a current surgical type or a corresponding cannula assembly configuration based on the current surgical type or the corresponding cannula assembly configuration. In some embodiments, the motion arm model may also be used to determine a usage sequence of surgical tools 31 on a plurality of following motion arms 2 based on a current surgical type or a corresponding cannula assembly configuration, so as to determine a motion sequence of the plurality of following motion arms 2.

In step 303, a predicted position and a predicted orientation of the at least one following motion arm are determined based on the reference pose of the reference motion arm and the relative pose relationship between the at least one following motion arm and the reference motion arm. For example, the predicted position and the predicted orientation of the at least one following motion arm 2 are determined based on the reference position and the reference orientation of the reference motion arm 1 and the relative pose relationship between the at least one following motion arm 2 and the reference motion arm 1. In some embodiments, the predicted position may be a position of each following motion arm 2 predicted in the motion arm model based on the reference position of the reference motion arm 1 and a position correspondence between each following motion arm 2 and the reference motion arm 1. The predicted orientation may be an orientation of each following motion arm 2 in a corresponding predicted position that is predicted in the motion arm model based on the reference orientation of the reference motion arm 1 and an orientation correspondence between each following motion arm 2 and the reference motion arm 1.

In step 305, simulated control is performed over the at least one following motion arm based on the predicted position and the predicted orientation. Exemplarily, simulated control may be performed, based on the predicted position and the predicted orientation of the at least one following motion arm 2, over each following motion arm 2 to move the following motion arm 2. It should be understood that predicted positions and predicted orientations of the following motion arms 2 may be different. In some embodiments, the simulated control may include: determining, based on the predicted position and the predicted orientation, whether the at least one following motion arm is within a motion range limit, and whether there is an undesired relationship between the at least one following motion arm and/or between the at least one following motion arm and the reference motion arm. In some embodiments, the motion range limit of the following motion arm 2 may include a motion limit of each of a plurality of joints of the at least one following motion arm 2. In some embodiments, the motion range limit of the following motion arm 2 may alternatively include an operable range that the following motion arm 2 can achieve. The operable range may include a preset range in which each following motion arm 2 does not collide with another following motion arm, the reference motion arm, or other obstacles in a position or an orientation of the following motion arm 2 during the motion. It should be understood that the undesired relationship may include a relationship of a collision between at least one following motion arm 2 and/or between the at least one following motion arm 2 and the reference motion arm 1. In response to that the following motion arm 2 is within the motion range limit when moving to the predicted position and the predicted orientation, and there is no undesired relationship between at least one following motion arm 2 and between the at least one following motion arm 2 and the reference motion arm 1, it is determined that the simulated control succeeds; otherwise, it is determined that the simulated control fails.

In some embodiments, the method 300 further includes step 307. In step 307, in response to a simulated control failure, the predicted position and the predicted orientation of the at least one following motion arm are adjusted, to avoid the motion range limit or the undesired relationship. In some embodiments, the predicted position may be adjusted based on a basic distance adjustment unit, and the predicted orientation may be adjusted based on a basic angle adjustment unit. Step 305 of the method 300 is performed again to perform simulated control over the at least one following motion arm based on the adjusted predicted position and predicted orientation.

In some embodiments, adjusting the predicted position and the predicted orientation may be: adjusting the predicted position and the predicted orientation based on a basic adjustment unit. The basic adjustment unit may include the basic distance adjustment unit and the basic angle adjustment unit. Exemplarily, in response to that the following motion arm 2 is not within the operable range when moving to the predicted position or the predicted orientation, or there is a collision between at least one following motion arm 2 and/or between the at least one following motion arm 2 and the reference motion arm 1, the predicted position or the predicted orientation is adjusted based on the basic adjustment unit. For example, a movement may be performed relative to the predicted position by 0.5 cm in each adjustment. The predicted orientation is adjusted based on the basic angle adjustment unit, for example, a rotation may be performed relative to the predicted orientation by 0.5° in each adjustment. The simulated adjustment is completed and the simulated control succeeds only when the adjusted predicted position and predicted orientation are within the operable range of the current following motion arm and the current following motion arm does not collide with any other following motion arm or the reference motion arm.

In some embodiments, the method 300 further includes step 309. In step 309, in response to a simulated control success, the predicted position and the predicted orientation of the at least one following motion arm are determined as the positioning position and the positioning orientation of the at least one following motion arm. In some embodiments, each following motion arm 2 is controlled, based on the determined positioning position and positioning orientation in response to the simulated control success, to move to the positioning position and positioning orientation. In some embodiments, the plurality of following motion arms 2 may be controlled, based on a preset motion sequence of the following motion arms 2 relative to the reference motion arm 1, to move to the positioning position and the positioning orientation, to avoid collision between motion arms during motion.

In this way, before each following motion arm 2 is moved, the simulated control is performed on the motion arm, and the positioning position and the positioning orientation of the following motion arm can be determined automatically, efficiently, and accurately. Based on the simulated control failure, the predicted position and the predicted orientation of the following motion arm 2 are adjusted. Based on the simulated control success, each following motion arm 2 is moved to the positioning position and the positioning orientation, which can avoid an abnormality such as a collision between the following motion arms 2 or between the following motion arm 2 and the reference motion arm 1 in an actual moving process. In this case, damage to each following motion arm 2 can be avoided, and costs can be reduced.

Figure 4:
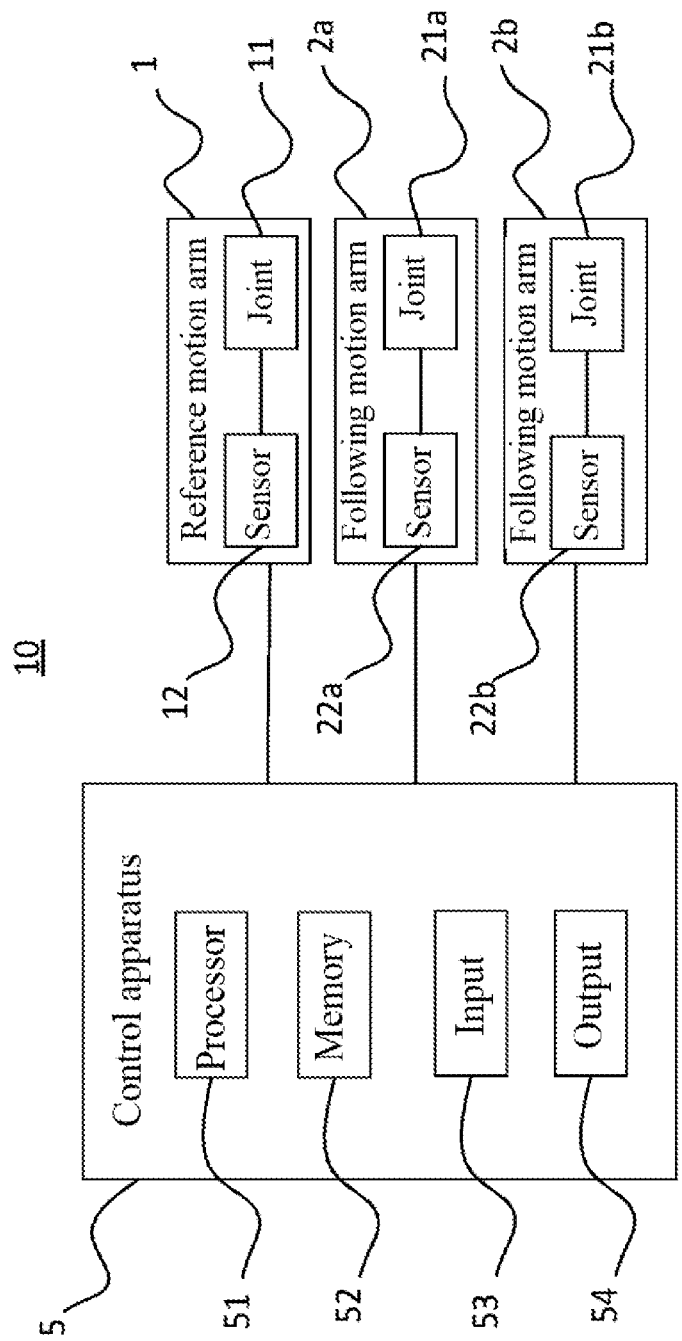
FIG. 4 is a simplified block diagram of a robot system according to some embodiments of the present disclosure.

FIG. 4 is a simplified block diagram of a robot system 10 according to some embodiments of the present disclosure. As shown in FIG. 4, the robot system 10 may include a reference motion arm 1, at least one following motion arm 2, and a control apparatus 5. In some embodiments, surgical instruments are detachably disposed on the reference motion arm 1 and the at least one following motion arm 2, and each surgical instrument is configured to enter an operation area through a cannula assembly. The control apparatus 5 may include at least one processor 51 and at least one memory 52. As shown in FIG. 4, in some embodiments, the control apparatus 5 may further include an input apparatus 53 and an output apparatus 54. The processor 51, the memory 52, the input apparatus 53, and the output apparatus 54 may be connected by a bus or in other manners.

The reference motion arm 1 may include a plurality of joints 11 and a sensor 12 connected to the plurality of joints 11. The at least one following motion arm 2 may include following motion arms 2a and 2b. The following motion arm 2a may include a plurality of joints 21a and a sensor 22a, and the following motion arm 2b may include a plurality of joints 21b and a sensor 22b. The plurality of joints 21a and the plurality of joints 21b may be coupled to the at least one sensor 22a and the at least one sensor 22b respectively. In some embodiments, the plurality of joints (for example, the joints 11, 21a, and 21b) may include motors, and the motors are communicatively connected to the sensors (for example, the sensors 12, 22a, and 22b). The sensors may include, for example, encoders, potentiometers, or fiber optic sensors disposed on the motion arm in an extending manner. The sensor may be configured to acquire data of a plurality of joints of a corresponding motion arm, so as to acquire current pose data of the motion arm. It should be understood that the current pose data may be position and orientation data at any moment, for example, initial pose data and pose data during motion.

The at least one processor 51 may be communicatively connected to the sensors 12, 22a, and 22b, for example, through a cable connection or wireless connection, to acquire current pose data of the reference motion arm 1, the following motion arm 2a, and the following motion arm 2b. In some embodiments, the processor 51 of the control apparatus 5 may control, based on a received input command, the reference motion arm 1 (for example, an end arm of the reference motion arm 1) to move to the reference position and the reference orientation. The sensor 12 may be configured to acquire data of the plurality of joints 11 of the reference motion arm 1, to acquire pose data of the reference motion arm 1, for example, pose data in the reference position and the reference orientation. The processor 51 may be communicatively connected to the sensor 12 of the reference motion arm 1, to acquire pose data of the reference motion arm 1, for example, pose data in the reference position and the reference orientation.

The memory 52 is configured to store a plurality of surgical types, corresponding cannula assembly configurations, and a plurality of motion arm models. The processor 51 may be communicatively connected to the memory 52, and the processor 51 may determine a corresponding motion arm model based on the current surgical type or the corresponding cannula assembly configuration, and determine a relative pose relationship between the following motion arm 2a and the reference motion arm 1 as well as between the following motion arm 2b and the reference motion arm 1 based on the motion arm model. The processor 51 may determine positioning positions and positioning orientations of the following motion arms 2a and 2b based on the reference position and the reference orientation of the reference motion arm 1 and the relative pose relationship between the following motion arm 2a and the reference motion arm 1 as well as between the following motion arm 2b and the reference motion arm 1, and control, based on the determined positioning positions and positioning orientations, the following motion arms 2a and 2b to move to the corresponding positioning positions and positioning orientations. In some embodiments, the processor 51 may further determine a motion sequence of the following motion arms 2a and 2b based on a current surgical type, and control, based on the motion sequence of the following motion arms 2a and 2b, the following motion arms 2a and 2b to move to the positioning positions and the positioning orientations. The sensors 22a and 22b may be configured to acquire data of the plurality of joints 21a and 21b of the following motion arms 2a and 2b, so as to acquire corresponding pose data of the following motion arms 2a and 2b, for example, pose data of the positioning positions and the positioning orientations.

In some embodiments, the robot system 10 may include, but is not limited to, one following motion arm, two following motion arms, three following motion arms, four following motion arms, or more following motion arms. It should be understood that the control apparatus 5 may acquire a relative pose relationship between the plurality of following motion arms and the reference motion arm.

Figure 5A:
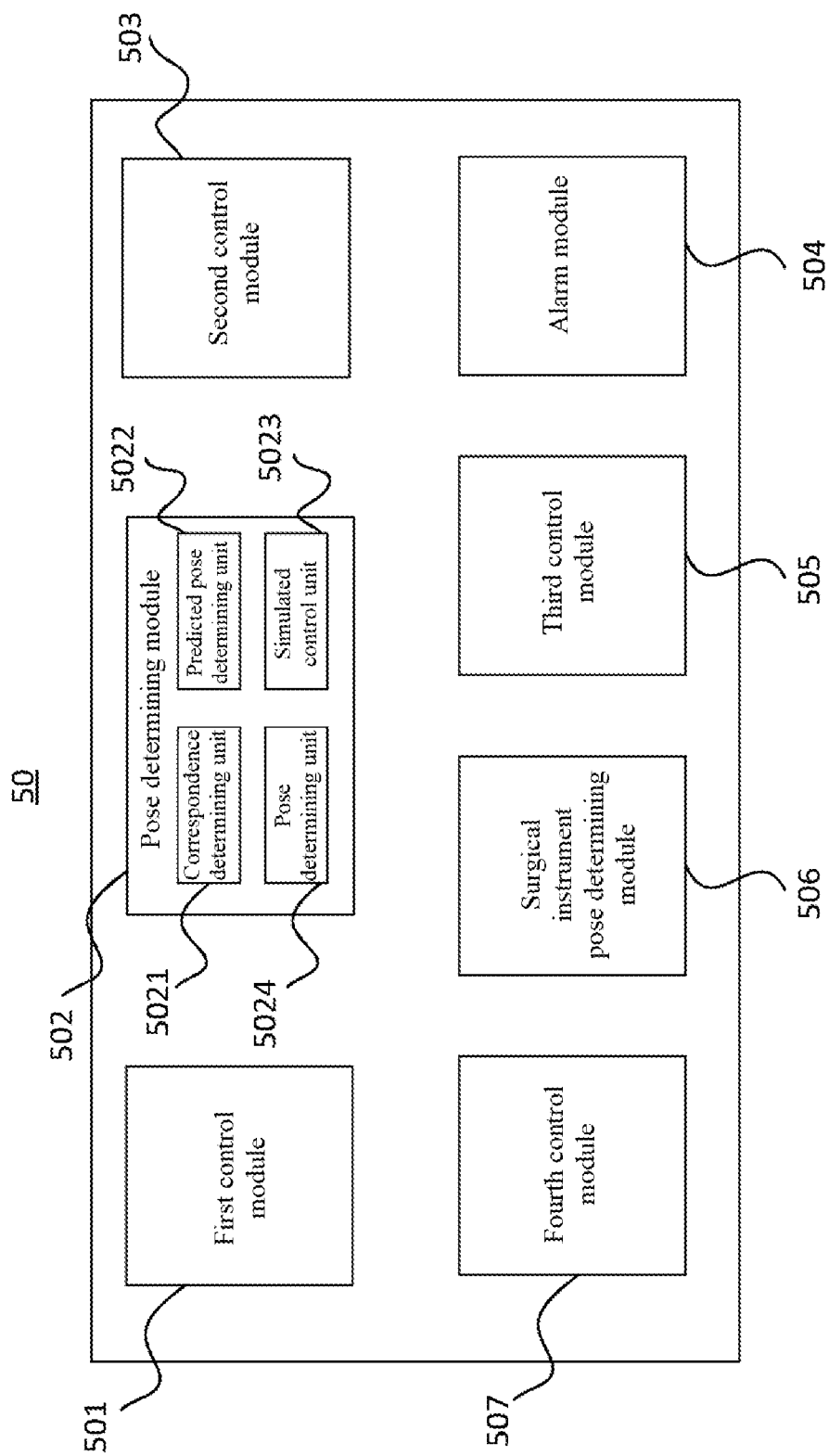
FIG. 5A is a simplified block diagram of another robot system according to some embodiments of the present disclosure.

In some embodiments, the memory 52 may be used as a computer-readable storage medium, and may be configured to store software programs, computer-executable programs, and modules, for example, program instructions/modules corresponding to the motion arm control method in the embodiments of the present disclosure (referring to a plurality of modules in FIG. 5A, for example, a first control module, a pose determining module, a second control module, an alarm module, a third control module, a surgical instrument pose determining module, and a fourth control module). The processor 51 may execute various functional applications and data processing of the robot system by running the software programs or instructions and modules stored in the memory 52, so as to perform the control method mentioned above.

In some embodiments, the memory 52 may include a program storage area and a data storage area. The program storage area may store an operating system and an application required for at least one function. The data storage area may store data created according to the usage of a terminal, or the like. In addition, the memory 52 may include a random access memory, and may further include a non-volatile memory, for example, at least one magnetic disk storage device, a flash memory device, or another non-volatile solid-state storage device. In some embodiments, the memory 52 may further include memories located remotely relative to the processor 51, and these remote memories may be connected to the robot system via a network. The network may include, but is not limited to, the Internet, an intranet, a local area network, a mobile communication network, and a combination thereof.

In some embodiments, the input apparatus 53 may be configured to receive input numerical information, character information, or pressing information, and generate a key signal input related to user setting and functional control of the robot system. The output apparatus 54 may include display devices such as a display screen, an indicator, and a speaker.

FIG. 5A is a simplified block diagram of a control apparatus 50 of a robot system according to some embodiments of the present disclosure. The control apparatus 50 may be implemented by a hardware or software module. As shown in FIG. 5A, the control apparatus 50 may include: a first control module 501, a pose determining module 502, and a second control module 503.

In some embodiments, the first control module 501 may control, based on an input command, a reference motion arm to move to a reference position and a reference orientation. The pose determining module 502 may determine a positioning position and a positioning orientation of at least one following motion arm based on a current surgical type or a cannula assembly configuration and the reference position and the reference orientation of the reference motion arm. The second control module 503 may determine a motion sequence of the at least one following motion arm based on a current surgical type, and control the at least one following motion arm to move to the positioning position and the positioning orientation.

In some embodiments, as shown in FIG. 5A, the pose determining module 502 may include a correspondence determining unit 5021, a predicted pose determining unit 5022, a simulated control unit 5023, and a pose determining unit 5024.

In some embodiments, the correspondence determining unit 5021 may be configured to determine an expected correspondence of at least one following motion arm relative to the reference motion arm based on a preconfigured motion arm model. The motion arm model is configured based on a current surgical type or a corresponding cannula assembly configuration, and the motion arm model is used to define the expected correspondence of the at least one following motion arm relative to the reference motion arm. It should be understood that the expected correspondence may include a relative pose relationship between at least one following motion arm 2 and the reference motion arm 1, and a relative pose relationship between following motion arms 2.

In some embodiments, the predicted pose determining unit 5022 may be configured to determine a predicted position and a predicted orientation of the following motion arm based on the reference position and the reference orientation of the reference motion arm and the expected correspondence of the at least one following motion arm relative to the reference motion arm. The simulated control unit 5023 is configured to perform simulated control over the at least one following motion arm based on the predicted position and the predicted orientation. The pose determining unit 5024 is configured to determine the predicted position and the predicted orientation as a positioning position and a positioning orientation of the at least one following motion arm when the simulated control succeeds.

In some embodiments, the control apparatus 50 may further include a motion stopping control module. The motion stopping control module may be configured to control, when it is detected that the at least one following motion arm has a collision when moving to the positioning position or the positioning orientation, the at least one following motion arm to stop moving.

Figure 5B:
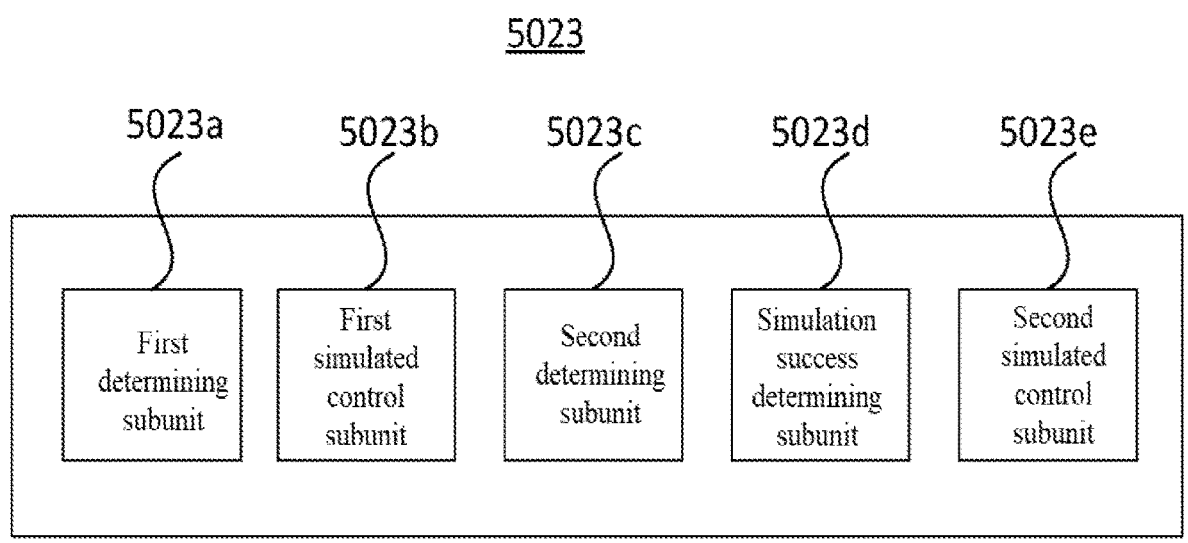
FIG. 5B is a simplified block diagram of a simulated control unit of the robot system in FIG. 5A according to some embodiments of the present disclosure.

FIG. 5B is a simplified block diagram of a simulated control unit 5023 of a control apparatus 50 of a robot system according to some embodiments of the present disclosure. In some embodiments, as shown in FIG. 5B, the simulated control unit 5023 may include a first determining subunit 5023a, a first simulated control subunit 5023b, a second determining subunit 5023c, and a simulation success determining subunit 5023d.

In some embodiments, the first determining subunit 5023a may be configured to determine whether the following motion arm is within a motion range limit when moving to the predicted position and the predicted orientation. The first simulated control subunit 5023b may perform simulated control, in response to that the following motion arm is within the motion range limit in the process of moving to the predicted position and the predicted orientation, over the following motion arm to move the following motion arm to the predicted position and the predicted orientation. In some embodiments, the at least one following motion arm includes a plurality of following motion arms. The first simulated control subunit 5023b may further control, based on the motion sequence of the plurality of following motion arms relative to the reference motion arm in response to that the plurality of following motion arms are within the motion range limit in the process of moving to the predicted position and the predicted orientation, the plurality of following motion arm to move to the predicted position and the predicted orientation. The second determining subunit 5023c may be configured to determine whether there is a collision between at least one following motion arm or between at least one following motion arm and the reference motion arm. The simulation success determining subunit 5023d may be configured to: when the following motion arm is within the motion range limit and at least one following motion arm does not collide with another motion arm, determine that the simulated control succeeds.

In some embodiments, as shown in FIG. 5B, the simulated control unit 5023 may further include a second simulated control subunit 5023e, which may adjust the predicted position and the predicted orientation, and perform simulated control based on the adjusted predicted position and predicted orientation in response to that the at least one following motion arm is not within the operable range of the at least one following motion arm when moving to the predicted position and the predicted orientation, or there is a collision between at least one following motion arm or between at least one following motion arm and the reference motion arm. In some embodiments, a basic adjustment unit may be utilized to adjust the predicted position and the predicted orientation, and perform simulated control based on the adjusted predicted position and predicted orientation. The basic adjustment unit may include a basic distance adjustment unit and a basic angle adjustment unit.

In some embodiments, as shown in FIG. 5A, the control apparatus 50 may further include: an alarm module 504 configured to send alarming information for an abnormality during motion of each motion arm. The abnormality includes at least one of the following: there is an undesired relationship (for example, a collision) between at least two of the plurality of motion arms, at least one of the at least one following motion arm exceeds the motion range limit, or a sterile protective sleeve on at least one of the plurality of motion arms falls off.

It should be understood that the robot system or the control apparatus provided by some embodiments of the present disclosure may perform the control method for a robot system provided by any embodiment of the present disclosure, and has corresponding functional modules and beneficial effects for executing the method.

In some embodiments, as shown in FIG. 5A, the control apparatus 50 may further include a third control module 505, a surgical instrument pose determining module 506, and a fourth control module 507. In some embodiments, the third control module 505 may control, based on the reference position and the reference orientation of the reference motion arm and a corresponding position and orientation of a cannula assembly, a surgical instrument on the reference motion arm to enter the cannula assembly to reach a target pose. The surgical instrument pose determining module 506 may determine, based on the target pose of a surgical instrument (for example, an end of an endoscope) on the reference motion arm and the positioning position and the positioning orientation of the at least one following motion arm, a target pose of a surgical instrument (for example, a surgical tool), in the cannula assembly, on the at least one following motion arm. The fourth control module 507 may control, based on the target pose of the surgical instrument, in the cannula assembly, on the at least one following motion arm, the surgical instrument on the at least one following motion arm to move into the cannula assembly to reach the target pose.

In some embodiments, the present disclosure provides a computer-readable storage medium. The storage medium may include at least one instruction, where the at least one instruction is executed by a processor, such that the processor is configured to perform the control method in any one of the above embodiments.

In some embodiments, the present disclosure provides a computer system that may include a non-volatile storage medium and at least one processor. The non-volatile storage medium may include at least one instruction. The processor is configured to execute the at least one instruction, so that the processor is configured to perform the control method in any one of the above embodiments.

According to the foregoing descriptions of the implementations, those skilled in the art may clearly understand that the present disclosure may be implemented by using software and required universal hardware, or certainly may be implemented by using hardware. Based on such an understanding, the technical solutions of the present disclosure essentially or the part contributing to related technologies may be implemented in a form of a software product. The computer software product may be stored in a computer-readable storage medium, such as a floppy disk of a computer, a read-only memory (ROM), a random access memory (RAM), a flash, a hard disk, or an optical disc, and includes several instructions for instructing a computer device (which may be a personal computer, a server, or a network device) to perform the methods described in the embodiments of the present disclosure.

The present disclosure further discloses the following:

Item 1. A control method for a robot system, where the robot system includes a plurality of motion arms, the plurality of motion arms include a reference motion arm and at least one following motion arm, and the control method includes:

controlling, based on an input command, the reference motion arm to move to a reference position and a reference orientation;

determining a positioning position and a positioning orientation of the at least one following motion arm based on the reference position and the reference orientation of the reference motion arm and a relative pose relationship between the plurality of motion arms; and controlling the at least one following motion arm to move to the positioning position and the positioning orientation.

Item 2. The control method according to item 1, further including: determining the relative pose relationship between the plurality of motion arms based on a surgical type or a cannula assembly configuration, where the relative pose relationship includes a relative pose relationship between the at least one following motion arm and the reference motion arm.

Item 3. The control method according to any one of items 1 and 2, where the input command includes a command input by a user by using an input apparatus or an instruction stored on a non-volatile storage medium.

Item 4. The control method according to any one of items 1 to 3, where the at least one following motion arm includes a plurality of following motion arms, and the method further includes:

determining a motion sequence of the plurality of following motion arms; and controlling, based on the motion sequence, the plurality of following motion arms to move to the positioning position and the positioning orientation.

Item 5. The control method according to item 4, further including: determining the motion sequence of the plurality of following motion arms based on a surgical instrument corresponding to the plurality of following motion arms or a position relationship between the plurality of following motion arms and the reference motion arm.

Item 6. The control method according to any one of items 1 to 5, where positions and orientations of the plurality of motion arms include one of the following:

positions and orientations of end arms of the motion arms;
positions and orientations of remote centers of motion (RCM) of the motion arms; or
positions and orientations of ends, for being connected to a cannula assembly, on the motion arms.

Item 7. The control method according to any one of items 1 to 6, further including:

determining a predicted position and a predicted orientation of the at least one following motion arm based on the relative pose relationship; and performing simulated control over the at least one following motion arm based on the predicted position and the predicted orientation.

Item 8. The control method according to item 7, where the performing simulated control over the at least one following motion arm based on the predicted position and the predicted orientation includes:

determining, based on the predicted position and the predicted orientation, whether the at least one following motion arm is within a motion range limit, and whether there is an undesired relationship between the at least one following motion arm and/or between the at least one following motion arm and the reference motion arm.

Item 9. The control method according to item 8, further including: in response to a simulated control failure, adjusting the predicted position and the predicted orientation of the at least one following motion arm, to avoid the motion range limit or the undesired relationship.

Item 10. The control method according to item 8, further including: in response to a simulated control success, determining the predicted position and the predicted orientation of the at least one following motion arm as the positioning position and the positioning orientation of the at least one following motion arm.

Item 11. The control method according to item 9, where the adjusting the predicted position and the predicted orientation of the at least one following motion arm includes:

adjusting the predicted position based on a basic distance adjustment unit; and adjusting the predicted orientation based on a basic angle adjustment unit.

Item 12. The control method according to item 8, where the motion range limit includes a motion limit of each of a plurality of joints of the reference motion arm and the at least one following motion arm, or the undesired relationship includes a collision.

Item 13. The control method according to any one of items 1 to 12, further including:

detecting an abnormality that occurs during motion of the at least one following motion arm; and based on the abnormality, controlling the at least one following motion arm to stop moving or sending of alarm information.

Item 14. The control method according to item 13, where the abnormality includes at least one of the following: there is an undesired relationship between at least two of the plurality of motion arms, at least one of the at least one following motion arm exceeds the motion range limit, or a sterile protective sleeve on at least one of the plurality of motion arms falls off.

Item 15. The control method according to any one of items 1 to 14, where the robot system further includes a surgical instrument detachably connected to the plurality of motion arms, and the reference position and the reference orientation of the reference motion arm and the positioning position and the positioning orientation of the at least one following motion arm are configured for the surgical instrument to reach a surgical operation area through the cannula assembly.

Item 16. The control method according to item 15, where a target position and a target orientation of the surgical instrument in the cannula assembly are determined based on the reference position and the reference orientation of the reference motion arm, the positioning position and the positioning orientation of the following motion arm, and a position and an orientation of the cannula assembly.

Item 17. The control method according to any one of items 1 to 16, where the reference position and the reference orientation of the reference motion arm are configured for the reference motion arm to be connected to the cannula assembly; and the positioning position and the positioning orientation of the at least one following motion arm are configured for the at least one following motion arm to be connected to the cannula assembly.

Item 18. A robot system, including:
a plurality of motion arms, where the plurality of motion arms include a reference motion arm and at least one following motion arm; and
a control apparatus, configured to: control, based on received input information, the reference motion arm to move to a reference position and a reference orientation, determine a positioning position and a positioning orientation of the at least one following motion arm based on the determined reference position and reference orientation and a relative pose relationship between the plurality of motion arms, and control the at least one following motion arm to move to the positioning position and the positioning orientation.

Item 19. The robot system according to item 18, where the control apparatus is further configured to: determine a motion sequence of the at least one following motion arm, and control, based on the motion sequence, the at least one following motion arm to the positioning position and the positioning orientation.

Item 20. A computer-readable storage medium including at least one instruction, where the at least one instruction is executed by a processor, such that the processor is configured to perform the control method according to any one of items 1 to 17.

Item 21. A computer system, including:
a non-volatile storage medium including at least one instruction; and
a processor configured to execute the at least one instruction, such that the processor is configured to perform the control method according to any one of items 1 to 17.

It should be noted that the foregoing descriptions are merely exemplary embodiments of the present disclosure and technical principles applied thereto. Those skilled in the art can understand that the present disclosure is not limited to the specific embodiments herein, and various obvious changes, readjustments, and substitutions can be made by those skilled in the art without departing from the protection scope of the present disclosure. Therefore, the present disclosure is described in detail by the foregoing embodiments, but the present disclosure is not limited to the foregoing embodiments. Other equivalent embodiments may also be included without departing from the concept of the present disclosure. Therefore, the scope of the present disclosure depends on the scope of the appended claims.

The invention claimed is:

1. A control method for a robot system, wherein the robot system comprises a plurality of motion arms, the plurality of motion arms comprise a reference motion arm and at least one following motion arm, the control method comprises:
controlling, based on an input command, the reference motion arm to move to a reference position and a reference orientation configured for the reference motion arm to be connected to a first cannula of a cannula assembly;
determining a positioning position and a positioning orientation configured for the at least one following motion arm to being connected to at least one second cannula of the cannula assembly based on the reference position and the reference orientation of the reference motion arm and a relative pose relationship between the plurality of motion arms; and
controlling the at least one following motion arm to move to the positioning position and the positioning orientation,
wherein the at least one following motion arm comprises a plurality of following motion arms, and the method further comprises:
determining a motion sequence of the plurality of following motion arms based on an initial position of each of the plurality of following motion arms and the reference position of the reference motion arm; and
controlling, after the reference motion arm is moved to the reference position and the reference orientation, based on the motion sequence, the plurality of following motion arms to sequentially move to the positioning position and the positioning orientation.

2. The control method according to claim 1, further comprising:
determining the relative pose relationship between the plurality of motion arms based on a surgical type or a cannula assembly configuration, wherein the relative pose relationship comprises a relative pose relationship between the at least one following motion arm and the reference motion arm.

3. The control method according to claim 1, wherein the input command comprises a command input by a user by using an input apparatus or an instruction stored on a non-volatile storage medium.

4. The control method according to claim 1, wherein positions and orientations of the plurality of motion arms comprise one of the following:
positions and orientations of end arms of the motion arms;
positions and orientations of remote centers of motion (RCM) of the motion arms; or
positions and orientations of ends, for being connected to a cannula assembly, on the motion arms.

5. The control method according to claim 1, further comprising:
determining a predicted position and a predicted orientation of the at least one following motion arm based on the relative pose relationship; and
performing simulated control over the at least one following motion arm based on the predicted position and the predicted orientation.

6. The control method according to claim 5, wherein the performing simulated control over the at least one following motion arm based on the predicted position and the predicted orientation comprises:

determining, based on the predicted position and the predicted orientation, whether the at least one following motion arm is within a motion range limit, and whether there is an undesired relationship between the at least one following motion arm and/or between the at least one following motion arm and the reference motion arm.

7. The control method according to claim 6, further comprising:
in response to a simulated control failure, adjusting the predicted position and the predicted orientation of the at least one following motion arm, to avoid the motion range limit or the undesired relationship.

8. The control method according to claim 6, further comprising:
in response to a simulated control success, determining the predicted position and the predicted orientation of the at least one following motion arm as the positioning position and the positioning orientation of the at least one following motion arm.

9. The control method according to claim 7, wherein the adjusting the predicted position and the predicted orientation of the at least one following motion arm comprises:
adjusting the predicted position based on a basic distance adjustment unit; and
adjusting the predicted orientation based on a basic angle adjustment unit.

10. The control method according to claim 6, wherein the motion range limit comprises a motion limit of each of a plurality of joints of the reference motion arm and the at least one following motion arm, or the undesired relationship comprises a collision.

11. The control method according to claim 1, further comprising:
detecting an abnormality that occurs during motion of the at least one following motion arm; and
based on the abnormality, controlling the at least one following motion arm to stop moving or sending of alarm information.

12. The control method according to claim 11, wherein the abnormality comprises at least one of the following: there is an undesired relationship between at least two of the plurality of motion arms, at least one of the at least one following motion arm exceeds the motion range limit, or a sterile protective sleeve on at least one of the plurality of motion arms falls off.

13. The control method according to claim 1, wherein the robot system further comprises a surgical instrument detachably connected to the plurality of motion arms, and the reference position and the reference orientation of the reference motion arm and the positioning position and the positioning orientation of the at least one following motion arm are configured for the surgical instrument to reach a surgical operation area through the cannula assembly.

14. The control method according to claim 13, wherein a target position and a target orientation of the surgical instrument in the cannula assembly are determined based on the reference position and the reference orientation of the reference motion arm, the positioning position and the positioning orientation of the following motion arm, and a position and an orientation of the cannula assembly.

15. A robot system, comprising:
a plurality of motion arms, wherein the plurality of motion arms comprise a reference motion arm and at least one following motion arm; and
a control apparatus, configured to: control, based on received input information, the reference motion arm to move to a reference position and a reference orientation configured for the reference motion arm to be connected to a first cannula of a cannula assembly, determine a positioning position and a positioning orientation configured for the at least one following motion arm to being connected to at least one second cannula of the cannula assembly based on the determined reference position and reference orientation and a relative pose relationship between the plurality of motion arms, and control the at least one following motion arm to move to the positioning position and the positioning orientation,
wherein the at least one following motion arm comprises a plurality of following motion arms, and the control apparatus is further configured to:
determine a motion sequence of the plurality of following motion arms based on an initial position of each of the plurality of following motion arms and the reference position of the reference motion arm; and
control, after the reference motion arm is moved to the reference position and the reference orientation, based on the motion sequence, the plurality of following motion arms to sequentially move to the positioning position and the positioning orientation.

16. A computer-readable storage medium comprising at least one instruction, wherein the at least one instruction is executed by a processor, such that the processor is configured to:
control, based on an input command, the reference motion arm to move to a reference position and a reference orientation configured for the reference motion arm to be connected to a first cannula of a cannula assembly;
determine a positioning position and a positioning orientation configured for the at least one following motion arm to being connected to at least one second cannula of the cannula assembly based on the reference position and the reference orientation of the reference motion arm and a relative pose relationship between the plurality of motion arms; and
control the at least one following motion arm to move to the positioning position and the positioning orientation,
wherein the at least one following motion arm comprises a plurality of following motion arms, and the processor is further configured to:
determine a motion sequence of the plurality of following motion arms based on an initial position of each of the plurality of following motion arms and the reference position of the reference motion arm; and
control, after the reference motion arm is moved to the reference position and the reference orientation, based on the motion sequence, the plurality of following motion arms to sequentially move to the positioning position and the positioning orientation.

* * * * *